Figure 1:
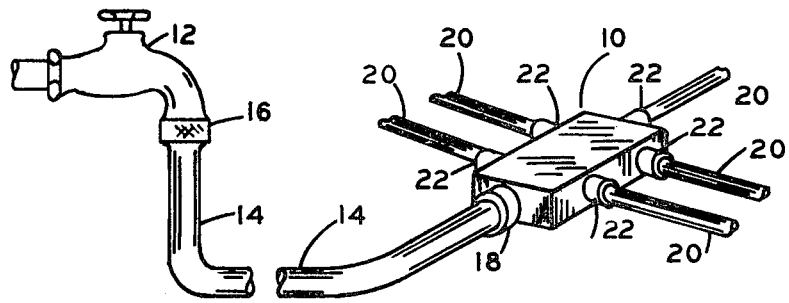

United States Patent
Schlesser

[11] 3,736,955
[45] June 5, 1973

[54] IRRIGATION CONDUIT STREAM DIVIDER

[76] Inventor: Adolph Schlesser, 1145 Phillips St., Vista, Calif. 92083

[22] Filed: June 14, 1971

[21] Appl. No.: 152,566

[52] U.S. Cl. .................137/561, 285/150, 239/542, 239/562
[51] Int. Cl. .............................F16l 41/00
[58] Field of Search...........................137/561, 608; 285/150, 156; 239/542, 546, 562

[56] References Cited
UNITED STATES PATENTS

| | | |
|---|---|---|
| 3,512,363 | 5/1970 | Whear.............................137/608 X |
| 2,598,961 | 6/1952 | Andrus..................................137/608 |
| 3,307,570 | 3/1967 | West...................................137/608 X |
| 2,148,419 | 2/1939 | Parker..................................285/150 X |
| 2,423,633 | 7/1947 | Baden...................................285/150 X |
| 3,506,029 | 4/1970 | Demler et al.........................137/561 |

*Primary Examiner*—Henry T. Klinksiek
*Attorney*—Duane C. Bowen

[57] ABSTRACT

In a divider housing, baffles interposed between irrigation water source conduit and distribution conduits preventing direct flow therebetween thereby substantially equalizing flow to the distribution conduits.

7 Claims, 5 Drawing Figures

PATENTED JUN 5 1973 3,736,955

ADOLPH SCHLESSER
INVENTOR

BY
ATTORNEY

IRRIGATION CONDUIT STREAM DIVIDER

BRIEF SUMMARY OF THE INVENTION

My invention concerns a form of water irrigation in which a garden hose or the like connects a source of water to a series of irrigating means such as a series of garden hoses connected to rotary sprinklers. Flow is equally distributed by an interposed housing having baffles preventing stream velocity causing substantally unequal distribution.

Water irrigation systems vary from small, simple apparatus, such as a single sprinker for a lawn, to large, complex systems, which irrigate sizable tracts of farm land. I am concerned with smaller systems such as might be used by a householder with an area too large to be sprinkled by a single sprinkler or such as might be used by a party having an orchard or truck garden of small or moderate size. Whereas my irrigation apparatus could be used on a larger tract, usually a form of large irrigation equipment will be used in which my flow divider would be inapplicable, i.e., irrigation ditches, gated pipe, rotary mobile irrigation rigs, etc.

One solution to the problem of irrigating a sizable residential lot, for example, is to provide underground pipes ending in fixed-position sprinklers. This system can work out well if carefully designed, but it is relatively expensive. The householder can use one or more sprinkling devices on the ends of garden hoses, or can use pervious or ported tubular irrigation conduits, but in a sizable lot too large to be irrigated by one setting of the sprinklers, a lot of householder time is spent in adjusting the location of sprinklers from one location to another.

My system can be said to involve an irrigation system midway (in terms of expense of equipment or installation, or in terms of operator time to use the system) between the underground system and the single sprinkler system. I provide division of the stream from a source such as a garden hose connected to a faucet to a series of movable surface irrigation lines which, in one setting, will irrigate all or a sizable part of a yard, orchard, garden, etc. In most designs such systems will work best, or will only be workable, if the supply to the series of lines is substantially equally divided from the source, so that relatively equal amount of water will be supplied to each distribution line. Equal distribution can result in relatively equal irrigation, which is important economically and otherwise. In fact, failure of operation can occur if distribution is not rather equal, i.e., not enough water may be supplied to a line to rotate a rotary sprinkler. A problem posed is to accomplish such equal distribution.

It is an objective of my invention to provide an irrigation conduit stream divider for the purpose above outlined; to devise an improvement in irrigation systems particularly for yard, orchard, and garden usage; and to provide a flow divider of low cost which can be sold at a price the average householder will find acceptable.

My invention will be best understood, together with additional advantages and objectives thereof, from the following description, read with reference to the drawings, in which:

FIG. 1 is an essentially schematical view, partly in perspective, showing portions of a surface water irrigation system incorporating an embodiment of my new flow divider.

Figure 2:
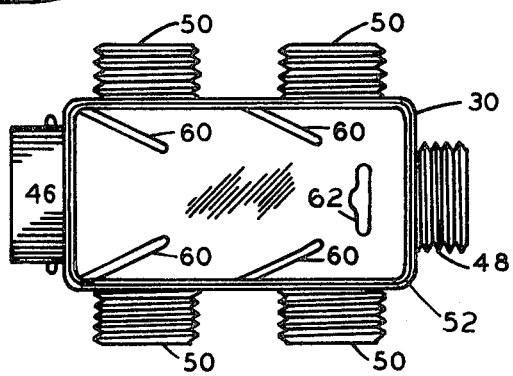
Figure 3:
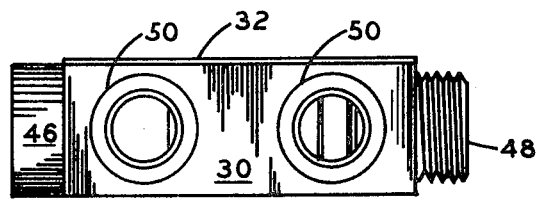
Figure 4:
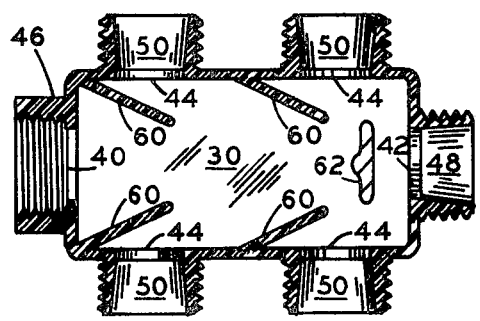
Figure 5:
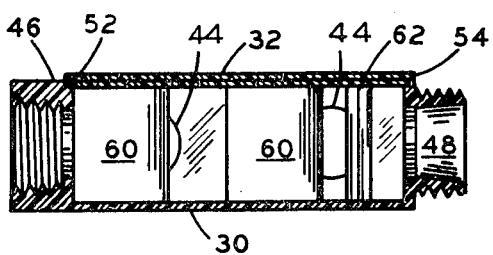

FIGS. 2, 3, 4, and 5 are views of the flow divider. FIG. 2 is a top view with the cover of the housing removed. FIG. 3 is a side view with the cover in place. FIG. 4 is a horizontal sectional view. FIG. 5 is a vertical sectional view with the cover in place.

FIG. 1 illustrates essentially schematically an example of one irrigation system using my new flow divider 10. The source of water is shown as a faucet 12 such as may be provided at locations around a house. A conduit 14 between the source and divider 10 may be a section of garden hose (of any needed length) with a female threaded coupling 16 attaching to the faucet and a male threaded coupling 18 attached to divider 10.

Distribution conduits 20 are shown as being of garden hose construction with female threaded couplings 22 connecting to divider 10. Distribution conduits 20 (of any length) could connect to any type of sprinkler, such as rotary sprinklers, could connect to pervious soaking tubes, or tubes with spaced sprinkling orifices, etc., or the conduits 20 could themselves be soaking or sprinkling tubes. With large enough hose, sufficient water pressure, and a desired irrigation rate consistent with that much division of whatever is the water stream maximum volume at the source, the system could even have a flow divider at the end of each distribution conduit to feed still other secondary distribution conduits.

Flow divider 10 is shown as being constructed of molded plastic of two pieces: the main part 30 of the housing, and a cover 32 later bonded in place (the separate cover being provided to facilitate molding of the interior of the housing). Divider 10 instead could be formed of other material, such as metal, but the preferred material is plastic, the construction being such that divider 10 can be mass-produced such as by injection molding and can be sold well within the price range most house-holders readily can pay.

In the preferred construction shown, housing 30 is an elongated right rectangle with six openings. One opening 40 is an inlet in one end. Another opening 42 is in the other end, and there are two outlet openings 44 in each side. A lesser or greater number of outlet openings could be provided, it will be readily understood, by following the basic flow-dividing design.

Housing 30 has outstanding a series of threaded bosses around the openings, boss 46 around inlet opening 40 having female interior threads, and boss 48 around outlet opening 42 and bosses 50 around outlet openings 44 having male exterior threads, all preferably sized to fit couplings standard in garden hose manufacture, such as couplings 18 and 22 in FIG. 1. A cap can be installed on any outlet opening not desired to be used in a particular irrigation layout.

The upper inner edge of the main part 30 of the housing is recessed providing a seat 52 and cover 32 is sized to fit into seat 52. Cover 32 has a marginal flange lip 54 abutting the remaining upper edge of the housing. After housing molding, cover 32 can be secured in a suitable manner, such as by bonding in the area of seat 52 and lip 54 by an adhesive compatible with the plastic used. Cover 32 preferably abuts the upper edges of the baffles hereafter described.

The problem will be understood to be to equalize flow from inlet opening 40 to outlet openings 42, 44. All openings, or at least the outlet openings, would be the same size at least in a general-purpose flow divider. The outlet openings would not, however, receive the same amount of water without baffles because the flow through inlet opening 40 would have a velocity (speed and direction) feeding unevenly to the outlet openings. In the design shown, if the baffles were removed, end outlet 42 would receive the greatest flow and probably openings 44 next adjacent to outlet 42 would receive more water than the other two outlets 44. This can be understood to be a generally unsatisfactory situation, as the operator would like to assume even flow from each outlet so that if each distribution line feeds about the same size area, each area will get about the same amount of water. If rotary sprinklers were used, for example, a line might be starved to the extent the sprinkler would not rotate.

I provide for substantially even flow to outlets 42, 44 by the side baffles 60 and end baffle 62 shown. Baffles 60, 62 are molded upstanding from the bottom of the housing (and outstanding from the upright walls of the housing in the case of baffles 60) and extend substantially across a portion of the housing to preferably abut or nearly abut cover 32 and are preferably bonded thereto (abutment being a function of the tolerances of the manufacturing processes). In each case, each baffle 60, 62 is in a position blocking direct flow from the inlet to one of the outlets, resulting in breakup of the incoming stream and resulting in changes in direction of flow, thereby substantially equalizing flow to the various outlet openings. As the baffles are symmetrical relative to the inlet, there is no tendency for the housing to twist.

Each baffle 60 extends diagonally relative to stream flow and relative to the longitudinal axis of housing 30, from an upright wall of the housing, between the inlet opening 40 and one of the side openings 44, preventing direct flow therebetween. One baffle 60 on each side extends from a corner of the housing and the other baffle 60 on the same side extends from the wall approximately half-way between the side openings 44.

It will be noted that the angle of each baffle 60 is less than 45° and, in fact, is nearer to half that angle in the proportions of the housing shown in the drawings. The proportions, size, etc., of the housing shown is only one feasible design but has worked out well in practice, the dimensions of a prototype housing being about 1 ½ inches wide, about 3 ¼ inches long, and about 1 ¼ inches high, with boss threads nominally about 1 inch diameter, and the diameters of the openings being about eleven-sixteenths inch. End baffle 62 is not supported by housing side walls. In the prototype dimensions given, end baffle 62 was about thirteen-sixteenths inch. It is positioned spaced from end opening 42 and blocking direct flow from inlet opening 40.

For convenience in connecting a garden hose to inlet opening 40, boss 46 may be converted to a rotatable connector by bonding into the housing a plastic or metal female connector of the type commonly sold on the market for installation of a female connector on the end of a garden hose.

It will be understood that the design results in turbulence of the stream within the housing in the process of equalizing outlet flow. Another way of putting the concept is that induced circulation, turbulence, change in stream direction, etc., tend to equalize pressure to the outlet openings. The outlet openings 44 closest to the inlet opening 40 would be most likely to be starved, i.e., the stream direction is toward the opposite end opening 42, and it will be observed there is good access to these openings as the stream is deflected, compared to more restricted access to the outlet openings at the other end. If the location of the housing on the ground were not quite flat, this could influence feed to outlets on one side, but the baffles tend to minimize such influence of gravity.

Having thus described my invention I do not wish to be understood as limiting myself to the exact details of the drawings and, instead, wish to cover those modifications thereof which will occur to those skilled in the art after learning of my invention and which properly fall within the scope of my invention.

I claim:

1. The improvement in water irrigating means for substantially equally dividing the stream from a source conduit among a series of distribution conduits, comprising:
   a. a housing having a series of spaced openings from different sides,
   b. each conduit being connected to one of said openings, and
   c. said housing having baffle means between the opening connected to said source conduit and each opening connected to one of said distribution conduits, each baffle being wider than its corresponding opening and extending substantially across a portion of said housing, whereby direct flow from said source conduit to said distribution conduits is blocked to break up flow from said source conduit and to avoid feeding substantially more water to one distribution conduit than to another distribution conduit due to the velocity of the stream from said source conduit affecting one distribution conduit more than another distribution conduit.

2. The subject matter of claim 1 in which said housing has threaded bosses outstanding around each of said openings for connection of said conduits thereto, and said conduits having threaded coupling means, in the manner of garden hose couplings, threadedly engaged with said bosses.

3. The subject matter of claim 2 in which said conduits are of flexible garden hose construction and the distribution conduits rest on the ground and the boss associated with said source conduit being female and the bosses associated with said distribution conduits being male.

4. The subject matter of claim 1 in which said openings lie in a common horizontal plane and said housing is rectangular and said opening is connected to said source conduit is in a first side wall and there is at least one opening connected to a distribution conduit in each wall adjacent to said first wall and said baffle means includes a baffle wall extending diagonally from the housing between said opening in said first wall and the opening in each adjacent wall to prevent direct flow of water therebetween.

5. The subject matter of claim 4 in which each adjacent wall has at least two openings connected to said distribution conduits and there are two parallel baffle walls extending from each adjacent wall, one baffle wall extending diagonally from a corner of the housing between the opening in the first wall and the next adjacent opening in the adjacent wall and the other baffle wall extending from the adjacent wall in a position between the two openings in that wall, each baffle wall preventing direct flow of water from the opening in the first wall to one of the openings in an adjacent wall.

6. The subject matter of claim 4 in which there is an opening connecting to a distribution conduit in the opposing wall opposite to said first wall, and said baffle means including a baffle wall parallel to and spaced from said opposing wall in front of said opening in said opposing wall blocking direct flow of water between said openings in first and opposing walls.

7. The subject matter of claim 6 in which said housing has integral construction of a bottom wall which rests on the ground and the side walls and said baffle walls which are upstanding from said bottom wall and said housing is open-topped during manufacture whereby it may be molded as one piece, and the upper inner edges of said side walls being recessed forming a seat, and a cover fitting down into said seat and having flange abutting the upper edges of said baffle walls and bonded in place.

\* \* \* \* \*